United States Patent [19]
Murouchi

[11] Patent Number: 6,067,144
[45] Date of Patent: May 23, 2000

[54] LCD CELL HAVING TWO SUPPORTING GAP MEMBERS DIFFERENT IN HEIGHT

[75] Inventor: Katsunori Murouchi, Hyogo-ken, Japan

[73] Assignee: Kabushiki Kaisha Toshiba, Kawasaki, Japan

[21] Appl. No.: 08/956,534

[22] Filed: Oct. 23, 1997

[30] Foreign Application Priority Data

Oct. 23, 1996 [JP] Japan ..................... 8-280855

[51] Int. Cl.⁷ ................................. G02F 1/1339
[52] U.S. Cl. ..................... 349/156; 349/154; 349/155
[58] Field of Search ................... 349/156, 153, 349/154, 110, 155

[56] References Cited

U.S. PATENT DOCUMENTS 5,459,598  10/1995  Carrington ..................... 349/156
5,636,043   6/1997  Uemura et al. ................. 349/153
5,838,414  11/1998  Lee et al. ..................... 349/156

*Primary Examiner*—William L. Sikes
*Assistant Examiner*—Toan Ton
*Attorney, Agent, or Firm*—Oblon, Spivak, McClelland, Maier & Neustadt, P.C.

[57] ABSTRACT

A rigid liquid crystal display cell is provided with superior productivity and durability. The liquid crystal display cell includes upper and lower substrates, two kinds of spacers with different heights, and a liquid crystal layer held between a gap defined by the upper and lower substrates. The upper and lower substrates are sealed at the peripheral by sealant. The liquid crystal material is put into the gap through an injection inlet. The substrate are pushed by the pressure to discharge superfluous liquid crystal material from the cell. An end seal closes the inlet but the width of the end seal to be sucked is kept in a predetermined range when the pressure applied to the substrates is removed.

8 Claims, 5 Drawing Sheets

LCD CELL HAVING TWO SUPPORTING GAP MEMBERS DIFFERENT IN HEIGHT

BACKGROUND OF THE INVENTION

1. Technical Field of the Invention

This invention relates to a liquid crystal display cell and, more particularly, to a liquid crystal display cell having a plurality of kinds of supporting members to keep spaces or gaps defined between two separate substrates.

2. Related Art

A liquid crystal display cell holds a liquid crystal layer in a gap defined between upper and lower substrates. In a conventional method of manufacturing such a liquid crystal display cell, the two substrates are sealed at the periphery thereof by a sealing material or sealant and a liquid crystal material is put into the cell through a liquid crystal injection inlet. The substrates of the cell are then pushed under the pressure applied to the substrates to discharge superfluous quantity of the liquid crystal material from the cell through the injection inlet. An end seal or a confining material is sucked up and hardens to close the injection inlet as the pressure is decreased or removed from the substrates.

In such a liquid crystal display cell, spacers are provided in the gap to define the distance between the upper and lower substrates in order to control the crystal layer thickness and to keep display quality good. There are ball-like silica or polyethylene spacers, pole-like spacers formed on the substrate through various patterning processes (see Japanese Laid-open Patent Applications Sho 59-139018 and Hei 5-196946) and the like. Since a liquid crystal display cell with the pole-like spacers has an advantage in less light leakage than one with the ball-like spacers has in the display region due to extraordinary alignment formed around the surroundings thereof. Demands for the latter are, thus, increasing.

As shown in FIG. 6, the pole-like spacers 12b and 12d, for instance, are formed and disposed on the light blocking layers (black matrix layers) 13a through 13d on a glass substrate 1 by means of the patterning processes. In order to control the liquid crystal layer thickness, the spacers 12a and 12d are about 5 μm in height. Fixed diameter ball-like spacers are also used for the same purpose. Regions BM and P in the drawings show light blocking and pixel portions, respectively.

The same height spacers or same diameter spacers are used to control the liquid crystal layer thickness. In this case, however, as shown in FIGS. 7 and 8, the end seal 14 is sucked up after the unnecessary quantity of the liquid crystal has been discharged from the injection inlet of the cell and the pressure has been decreased or removed from the substrates. The sucked width or depth 6 of the end seal 14 is in proportion to the pressure applied to the substrates which have been fixed together by the sealant 15. Although the sucked width 6 of the end seal depends on liquid crystal display cells, it is necessary to make it about 1.0 mm from view points of strength and the like of the confining portion 16. As shown in characteristic curves (a) and (b) in FIG. 8, a pressure range to make the width proper (0.8 mm through 1.2 mm in a given example) is so limited that the pressure (magnitude and distribution) applied to the cell must be set up strictly. If the pressure state is changed due to positioning jigs used for application of the pressure, the sucked width δ is easily subject to fluctuation of the pressure. When the width δ is smaller than 0.8 mm, the cell lacks of the strength, the leakage of the liquid crystal material therefrom takes place, the production yield thereof becomes low, and the durability thereof also becomes poor. When the width δ is greater than 1.2 mm, the end seal is put into the display region so that it brings about an improper display.

It is important to suppress the problems due to the width change as set forth above. If the number of spacers is increased as for spacers 12a through 12d in FIG. 9 or for ball-like spacers, a possibly loaded pressure to the substrates does not furnish a sufficiently sucked width of the end seal as shown in a curve (c) of FIG. 8. A liquid crystal display cell with a satisfactory strength cannot be necessarily produced.

SUMMARY OF THE INVENTION

The present invention is to overcome such problems. one of its objects is to provide a rigid liquid crystal display cell with superior productivity and durability.

A liquid crystal display cell of the present invention includes first and second substrates of which the main surfaces face with each other, a liquid crystal layer held in a gap defined between the first and second substrates, and first and second gap supporting members provided with different heights, respectively.

In assembling the liquid crystal display cell, the surroundings of the first and second substrates are sealed and fixed together by sealant. A liquid crystal is put into the gap through a liquid crystal injection inlet provided at the sealant. Pressure is applied to the first and second substrates to push out some superfluous quantity of the liquid crystal material. An end seal is sucked up to close the inlet due to decrease or removal of the pressure. The heights of the first and second gap supporting members, or spacers, are designed to make the sucked width of the end seal appropriate for strength and display quality of the cell. In other words, the sucked width is kept substantially constant by the structure in accordance with the invention regardless of fluctuation of the pressure applied to the substrates while the quantity of the liquid crystal to be pushed out depends on the pressure.

Although the pressure applied to the substrates in discharging the superfluous liquid crystal material through the inlet differs with each liquid crystal display cell, it ranges generally from 2.0 kg/cm² through 4.0 kg/cm².

Any material without limitation may be used for the invention so far as it is a good heat- and chemical-resistant material and suitable for liquid crystal display cells. Usually, it is a glass substrate made of blue plate glass, white plate glass, quartz glass or the like. The substrates have main surfaces to hold the liquid crystal layer.

Any material without limitation may be used for the first and second gap supporting members or spacers so far as it is capable of setting the first and second heights to keep the gaps between the first and second substrates. The ball-like spacers used for the supporting members are made of melamine resin, urea resin, polystyrene resin, or silica. The pole-like spacers formed on the substrate through the patterning processes are preferable for the supporting members because the pole-like spacers have an advantage in that light leakage around them in the display region due to abnormal liquid crystal alignment is less than that of the ball-like spacers.

The ball-like spacers may be disposed in the gap between the first and second substrates by scattering the same. The pole-like spacers may be disposed at any place on the substrate unless they affect display quality of the liquid crystal display cell. The pole-like spacers are formed and disposed on black matrices, for instance, where no negative influence is effective on the aperture ratio. The processes through which the pole-like spacers are formed on the substrate may be independent of other patterning processes. The pole-like spacers, however, are desirably formed at the same time when color filter components are formed and in parallel with the color filter patterning processes of red, blue and green color polyimide resins in order to avoid increase in the number of processes.

With respect to the distances between the first and second substrates, preferably, the height of the first gap supporting member ranges from 2.0 $\mu$m through 10.0 $\mu$m while that of the second one from 1.0 $\mu$m through 9.0 $\mu$m in either one of the ball-like and pole-like spacers so that the absolute difference between the first and second heights may range from 0.1 $\mu$m through 9.0 $\mu$m.

The desirably disposed density of the first and second gap supporting members is substantially uniform over the display region. In the case of the ball-like spacers, the density of the first supporting members is from 0.1/pixel through 10/pixel while that of the second supporting one from 0.1/pixel through 10/pixel. Further, in the case of the pole-like spacers, the density of the first supporting members is from 0.1/pixel through 0.9/pixel while that of the second supporting members is from 0.1/pixel through 0.9/pixel. The first and second pole-like spacers are cylinders, rectangular parallelepipeds, or cubes in shape but the maximum cross-sectional area thereof cut in parallel with the main surface of the substrate ranges from about 50 $\mu$m$^2$ through 500 $\mu$m$^2$.

In the liquid crystal display cell of the present invention, the first and second substrates are sealed at the surroundings thereof by the sealant. The liquid crystal is put into the gap between the substrates through the liquid crystal injection inlet provided in the sealant. The injection inlet is closed by the end seal so that the liquid crystal material can be, thus, contained between the substrates. Ordinary liquid crystal display cell sealant may be used for the sealant. They are mainly thermosetting resins or ultraviolet setting resins. One-part type resin or a two-part type one dispensed prior to use may be utilized as the former. The two-part type thermosetting resin may be composed of high bridging (cross-linking) epoxy or phenol resin and an amine, carboxylic acid or acid anhydride setting material.

It is necessary for the end seal to tightly close the liquid crystal injection inlet even in cases where it contacts the liquid crystal or where the substrates and the confining portion are wet with the liquid crystal. High purity silicone resin, ultraviolet setting resin or acrylic resin is suitable for the end seal.

The present invention is applicable to any liquid crystal display cell regardless of driving methods such as a simple-matrix type and an active-matrix type in the case where the cell is assembled through the processes in which pressure is applied to the two substrates. Superfluous quantity of a liquid crystal material is discharged from the inlet under the pressure. The end seal is sucked into the inlet as the pressure is decreased or removed. The end seal is set to tightly close the inlet. The liquid crystal material is, thus, contained between the substrates.

The above-stated and other objects and advantages of the invention will become apparent from the following description when taken with the accompanying drawings. It will be understood, however, that the drawings are for the purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views.

DESCRIPTION OF THE PREFERRED EMBODIMENT

Figure 1:
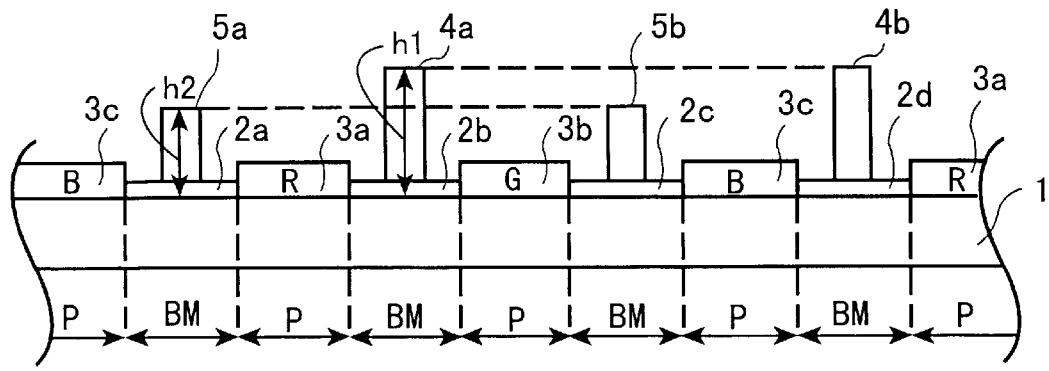
FIG. 1 is a schematic side view of color resin layers and two kinds of spacers formed on a glass substrate in accordance with the present invention.

Embodiments of liquid crystal display cells of the present invention will be explained with reference to the attached drawings. In each drawing, substantially the same components have same reference numerals or characters and explanation thereof are omitted for the sake of simplicity.

On a 1.1 mm thick glass substrate, black matrix layers 2a through 2d, red, green and blue color-pigment dispersed resin layers 3a, 3b and 3c and spacers 4a and 4b with heights h1 and h2 of 5.0 $\mu$m and 4.5 $\mu$m, respectively, are formed through a pigment dispersion method (an etching method) shown in FIG. 2. The characters BM and P in FIG. 1 represent light blocking layers (black matrix layers) and pixels, respectively.

Figure 2A:
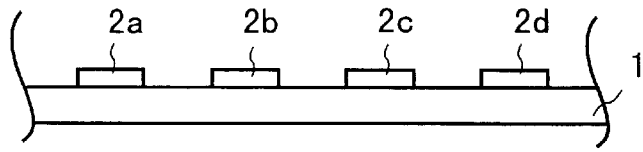
FIG. 2 is a schematic side view to explain processes to make the color resin layers and spacers on the glass substrate.
Figure 2B:
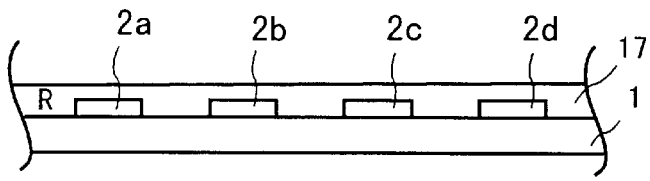
Figure 2C:
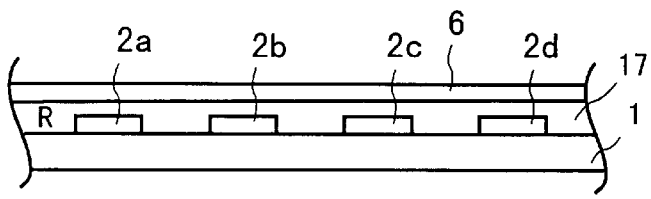
Figure 2D:
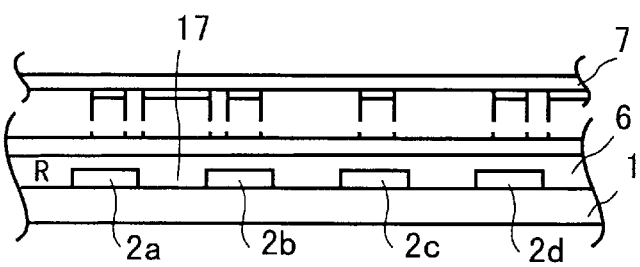
Figure 2E:
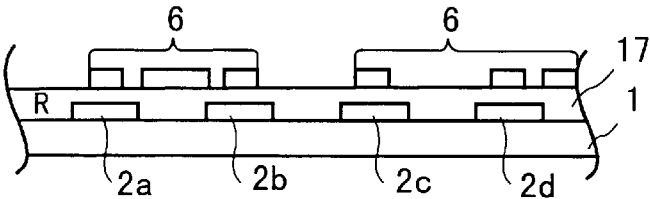
Figure 2F:
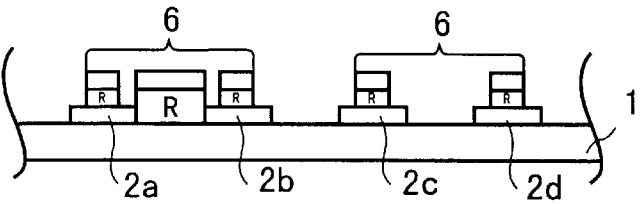
Figure 2G:
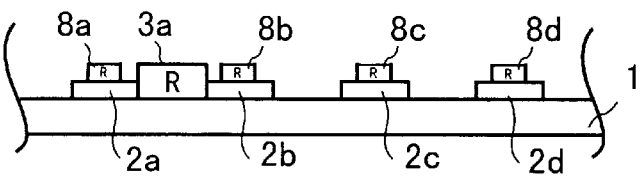
Figure 2H:
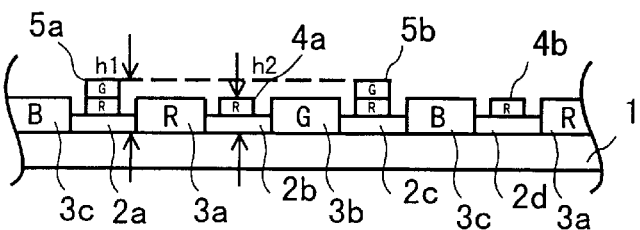

As shown in FIG. 2, red color-pigment dispersed polyimide precursor liquid is coated by a spin coater on a glass substrate on which black matrix layers 2a through 2d have been formed (FIG. 2(a)). The polyimide precursor liquid is dried and preliminarily heated (FIG. 2(b)). Positive photoresistant resin 6 is applied to it (FIG. 2(c)). Optical exposure to the device covered with the resistant resin is carried out through a mask 7 (FIG. 2(d)). In order to form spacers simultaneously, a predetermined area over the black matrix layers is also optically exposed through the mask 7. Development of the positive resistant resin 6 and etching of the color resin layers are performed by alkaline aqueous solution (FIGS. 2(e) and 2(f)). The resistant resin 6 is pealed by organic solvent so that the red resin layers 3a and spacer patterns 8a through 8d are formed (FIG. 2(g)). Substantially the same processes are repeated to form patterns 3b and 3c of the green and blue resin layers but either the green or blue resin layer is not formed on the patterns 8b and 8d corresponding to spacers 4a and 4b in the forming processes of the green and blue resin layers 3b and 3c (FIG. 2(h)). The spacers 4a and 4b, and 5a and 5b are 4.5 $\mu$m and 5.0 $\mu$m in height from the glass substrate 1, respectively. The spacers are both 0.5/pixel in density and the maximum cross-sectional area thereof cut in parallel with the glass substrate 1 is 150 $\mu$m$^2$ in both of the spacers.

Figure 3:
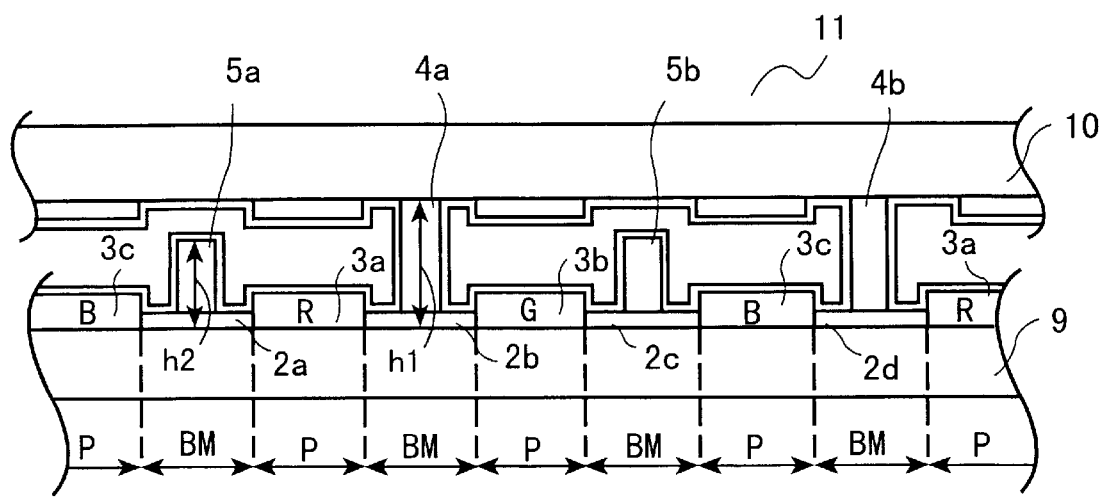
FIG. 3 shows a schematic side view of a liquid crystal cell of the invention.
Figure 4:
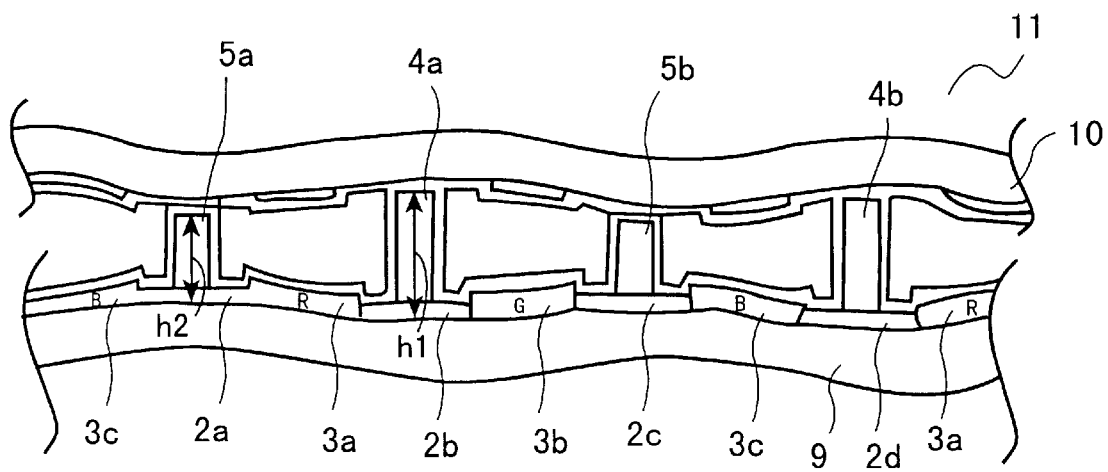
FIG. 4 shows a state of the liquid crystal display cell to which the pressure of 2.0 kg/cm$^2$ is applied.

Next, a substrate 9 (color filter substrate) illustrated in FIG. 3 is consists of the substrate shown in FIG. 1 and display electrodes formed on the substrate but not shown therein. There is another 1.1 mm thick glass substrate 10 (array substrate) on the main surface of which display electrodes (not shown), driving elements (not shown either) and electrodes to supply electricity thereto are formed. After being subjected to an alignment process, the substrates 9 and 10 are put together by applying sealant to the surroundings thereof like a bag so as to make a diagonal 16 inch display cell with an inlet for injection and discharge of a liquid crystal material into and from the cell, respectively. When the pressure applied to the cell 11 is 2.0 kg/cm² or less, spacers 4a and 4b support it. In the case where the pressure is more than 2.0 kg/cm², the spacers 4a, 4b, 5a and 5b support it as shown in FIG. 4.

Figure 5:
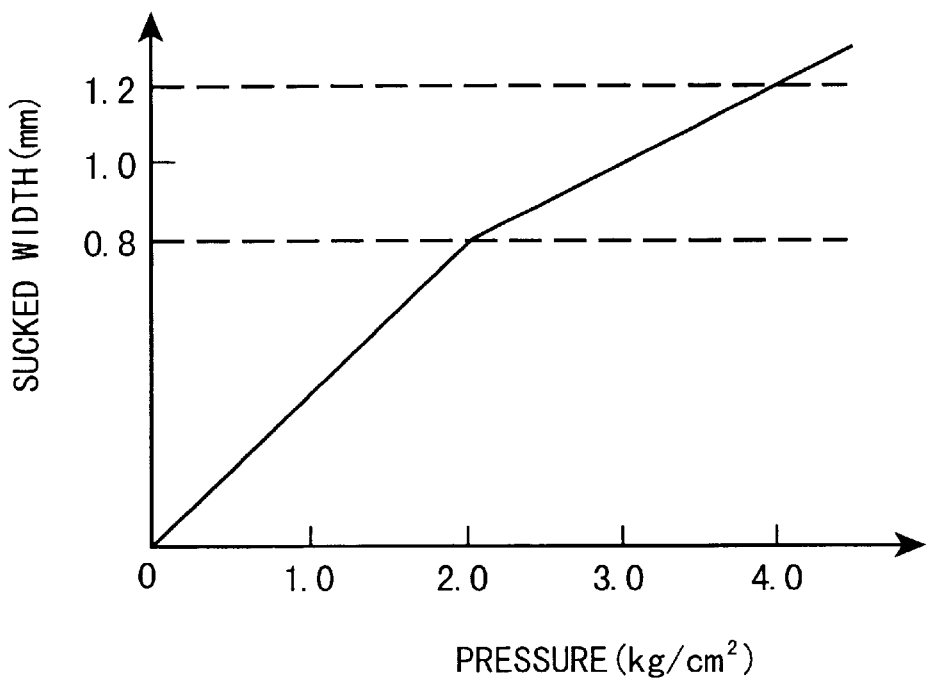
FIG. 5 is a characteristic curve to show the relationship between pressure applied to the cell and sucked width of an end seal or a confining material at a liquid crystal injection inlet.

After preparation of a plurality of the cells 11, a mixture of a liquid crystal composition (e.g., ZLI-1132 manufacture by E. Merck GmbH) and a chiral material (e.g., S-811 manufactured by E. Merck GmbH) is fully injected into each of the cells. The pressure varying from 0 through 4.0 kg/cm² is then applied to each cell 11 and some superfluous quantity of the liquid crystal composition and chiral material are discharged therefrom. Further, an end seal (e.g., UV 1007 manufactured by Sony Chemical, Inc.) is sucked through the inlet of the cell 11 at the same time when the pressure is decreased or removed therefrom. FIG. 5 indicates the relationship between the pressure applied to the cell 11 and the sucked width $\delta$ of the end seal sucked through the inlet.

Apparent from FIG. 5, the sucked width $\delta$ of the end seal through the inlet increases rapidly in the case where the pressure applied to the cell is 2.0 kg/cm² or less. The sucked width $\delta$, however, rises gradually in the case where the pressure applied to the cell 11 is more than 2.0 kg/cm².

It is deemed that not only the spacers 5a and 5b but also those 4a and 4b support the cell 11 in the case where the pressure applied to the cell 11 is more than 2.0 kg/cm². As a result, deformation of the cell 11 is effectively suppressed even in that case so that the increasing rate of the sucked width $\delta$ decreases.

In the case of this particular embodiment where the sucked width $\delta$ is 1±0.2 mm as a technical specification, the loaded pressure which the cell 11 is can bear to satisfy the specification ranges from 2.0 kg/cm² through 3.8 kg/cm².

Figure 6:
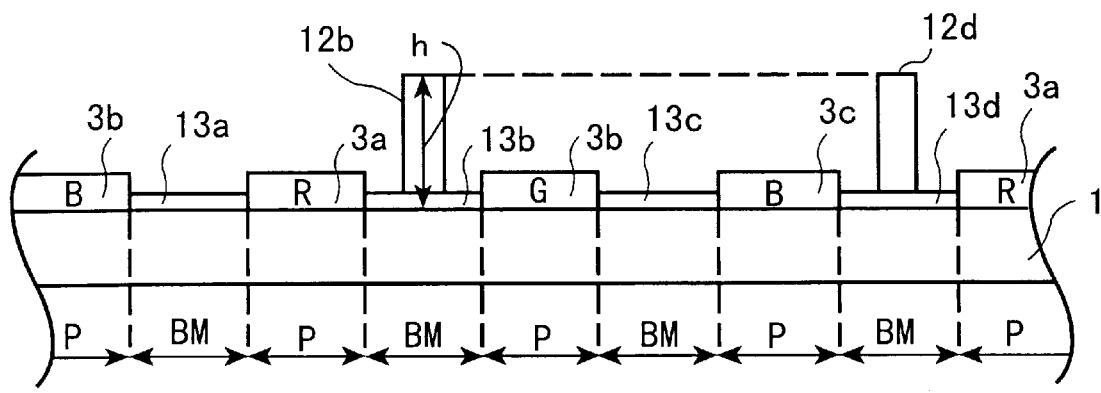
FIG. 6 is a side view of conventional color resin layers and 5.0 $\mu$m thick spacers.
Figure 7:
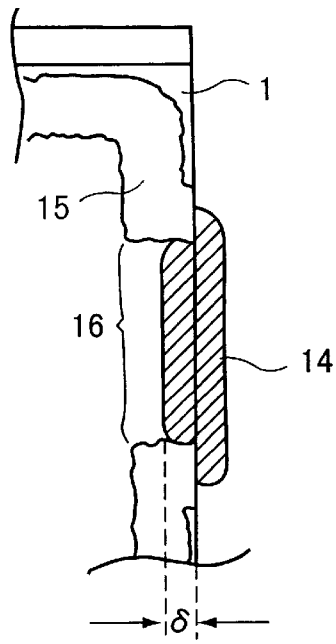
FIG. 7 is a schematic cross-sectional view of the sucked end seal at the injection inlet.
Figure 8:
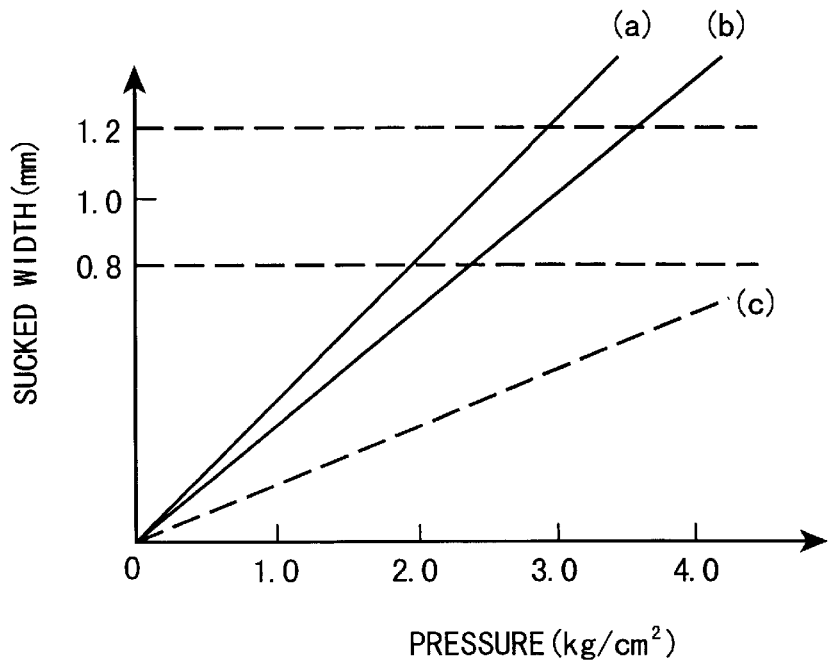
FIG. 8 shows characteristic curves to show the relationship between the pressure and the sucked end seal widths.
Figure 9:
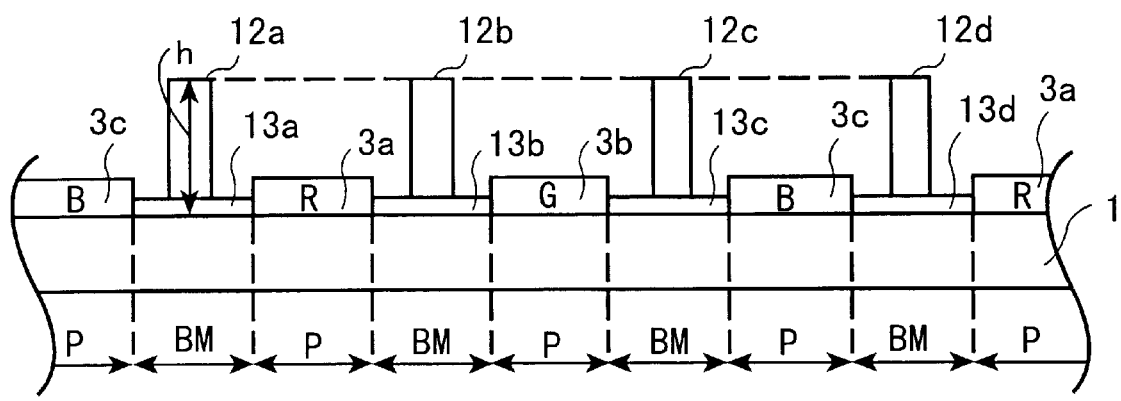
FIG. 9 is a side view of conventional color resin layers and 5.0 $\mu$m thick spacers formed on a glass substrate.

A liquid crystal display cell is prepared as a comparison example which is identical in construction to the embodiment as set forth above except spacers 12b and 12d with 0.5/pixel in density and 5.0 $\mu$m in height from the glass substrate as shown in FIG. 6. Such a liquid crystal display cell is used to study the relationship between the pressure applied to it under the same conditions as of the embodiment and the sucked width of the end seal through the inlet.

The specification of the sucked width $\delta$ of 1±0.2 mm is set for the comparison example. The possibly loaded pressure as a consequence of compliance with the specification is in a range from 2.0 kg/cm² through 3.0 kg/cm², which is narrower than that of the embodiment.

According to the embodiment of this invention, the pressure applied to the cell need not be strictly controlled. Thus, it has an advantage in comparison with the comparison example in that the sucked width of the end seal can be kept stable and in a fixed range to compare even in the case of fluctuations of the pressure applied to the cell. The embodiment of the invention attains the improvement of production yield on a liquid crystal display cell. The sucked width of the end seal necessary for the strength of a liquid crystal display cell is satisfactorily set within a range of the pressure applied to the cell. The embodiment of the invention provides a liquid crystal display cell with the sufficient confining strength and durability.

The embodiment has the spacers with two different kinds of heights and same distribution density. A liquid crystal display cell of the invention may have a variety of heights, configurations, kinds, distribution density, and combinations thereof to control the possibly loaded pressure applied to the cell to satisfy the necessary sucked width of the end seal.

As described above in detail, a liquid crystal display cell in accordance with the present invention includes first and second supporting members or spacers with different heights disposed in gaps between first and second substrates. With the structure, the sucked width of an end seal can be kept substantially in a predetermined range regardless of states of the pressure applied to the cell. The present invention provides a rigid liquid crystal display cell with superior productivity and durability.

What is claimed is:

1. A liquid crystal display cell comprising:

first and second substrates having main surfaces opposite each other;

first and second gap supporting members disposed in a gap defined by said first and second substrates, wherein said first gap supporting members range from 2.0 $\mu$m through 10.0 $\mu$m in height, said second gap supporting members range from 1.0 $\mu$m through 9.0 $\mu$m in height, and a difference in height between said first and second gap supporting members ranges from 0.1 $\mu$m through 9.0 $\mu$m;

a sealant configured to seal surroundings of said first and second substrates;

a liquid crystal injection inlet provided at the surroundings of said first and second substrates;

a liquid crystal material configured to be injected into the gap through said injection inlet; and an end seal configured to close said injection inlet;

whereby a superfluous quantity of said liquid crystal material is discharged from said liquid crystal display cell under pressure applied to said first and second substrates and a sectional width of said end seal to be sucked is kept in a predetermined range when the pressure is decreased or removed from said first and second substrates.

2. The liquid crystal display cell according to claim 1, wherein said first substrate has light blocking layers on the main surface thereof, and said first and second gap supporting members are formed on said light blocking layers.

3. The liquid crystal display cell according to claim 1, wherein said first and second gap supporting members are pole-like in configuration.

4. The liquid crystal display cell according to claim 1, wherein the heights of said first and second gap supporting members are 5.0 $\mu$m and 4.5 $\mu$m, respectively, the pressure ranges from 2.0 kg/cm² through 3.8 kg/cm² and the width is 1±0.2 mm.

5. The liquid crystal display cell according to claim 1, wherein the distribution density of each of said first and second gap supporting members is uniform.

6. A liquid crystal display cell comprising:

first and second substrates having main surfaces opposite each other;

light blocking layers provided on the main surface of either one of said first and second substrates;

color filter layers separated by said light blocking layers, respectively;

first and second gap supporting members disposed in a gap defined by said first and second substrates, wherein said first and second gap supporting members are column spacers provided on said light blocking layers and different in height from each other, said first gap supporting members range from 2.0 $\mu$m through 10.0 $\mu$m in height, said second gap supporting members range from 1.0 $\mu$m through 9.0 $\mu$m in height, and the difference in height between said first and second gap supporting members ranges from 0.1 $\mu$m through 9.0 $\mu$m;

a sealant configured to seal surroundings of said first and second substrates;

a liquid crystal injection inlet provided at the surroundings of said first and second substrates;

a liquid crystal material configured to be injected into the gap through said injection inlet; and an end seal configured to close said injection inlet;

whereby a superfluous quantity of said liquid crystal material is discharged from said liquid crystal display cell under pressure applied to said first and second substrates and a sectional width of said end seal to be sucked is kept in a predetermined range when the pressure is decreased or removed from said first and second substrates.

7. The liquid crystal display cell according to claim 6, wherein said first and second column gap supporting members, said light blocking layers and said color filter layers are made of same material.

8. The liquid crystal display cell according to claim 6, wherein said first and second gap supporting members, said light blocking layers and said color filter layers are made of pigment dispersed resins.

* * * * *